(12) United States Patent
Parkhou et al.

(10) Patent No.: US 11,901,809 B2
(45) Date of Patent: Feb. 13, 2024

(54) MODULAR MULTILEVEL CONVERTER PRE-CHARGING

(71) Applicant: VESTAS WIND SYSTEMS A/S, Aarhus N. (DK)

(72) Inventors: Masoud Parkhou, Hammel (DK); Lars Helle, Suldrup (DK); Cem Özgür Gerçek, Regensburg (DE)

(73) Assignee: VESTAS WIND SYSTEMS A/S, Aarhus N. (DK)

( * ) Notice: Subject to any disclaimer, the term of this patent is extended or adjusted under 35 U.S.C. 154(b) by 33 days.

(21) Appl. No.: 17/762,326

(22) PCT Filed: Sep. 17, 2020

(86) PCT No.: PCT/DK2020/050256
§ 371 (c)(1),
(2) Date: Mar. 21, 2022

(87) PCT Pub. No.: WO2021/052546
PCT Pub. Date: Mar. 25, 2021

(65) Prior Publication Data
US 2022/0278604 A1  Sep. 1, 2022

(30) Foreign Application Priority Data
Sep. 19, 2019 (DK) .......................... PA 2019 70576

(51) Int. Cl.
*H02M 7/483* (2007.01)
*H02M 1/00* (2006.01)
(Continued)

(52) U.S. Cl.
CPC ............. *H02M 1/32* (2013.01); *H02J 7/0016* (2013.01); *H02J 7/0019* (2013.01);
(Continued)

(58) Field of Classification Search
CPC ..... H02M 7/4833; H02M 7/4835; H02M 1/32
See application file for complete search history.

(56) References Cited

U.S. PATENT DOCUMENTS

2014/0042817 A1\* 2/2014 Zargari .................. H02M 1/32
307/77
2014/0146586 A1  5/2014 Das et al.
(Continued)

FOREIGN PATENT DOCUMENTS

CN  109067162 A  12/2018
EP  3032680 A1 \* 6/2016 .............. B60M 3/00
(Continued)

OTHER PUBLICATIONS

PCT, International Search Report for Application PCT/DK2020/050256 dated Oct. 30, 2020.
(Continued)

*Primary Examiner* — Sisay G Tiku
(74) *Attorney, Agent, or Firm* — Patterson + Sheridan, LLP (57) ABSTRACT

According to embodiments described herein a Modular Multilevel Converter (MMC) is pre-charged by: driving a bypass current from an auxiliary power source through a plurality of bypass switches included in a corresponding plurality of cells; in response to a summed voltage across a plurality of cell capacitors included in the plurality of cells satisfying a drive threshold, driving an insert current through a plurality of insert switches included in the plurality of cells; and in response to a voltage across a Direct Current (DC) link capacitor satisfying a pre-charge threshold when driving the insert current, opening a circuit breaker connecting the auxiliary power source with the plurality of cells and connecting a generator with external power line rails between which the DC link capacitor is connected.

11 Claims, 7 Drawing Sheets

(51) Int. Cl.
H02M 1/32 (2007.01)
H02J 7/00 (2006.01)
H02J 3/46 (2006.01)
H02J 7/34 (2006.01)
H02M 1/36 (2007.01)

(52) U.S. Cl.
CPC ....... *H02M 1/0067* (2021.05); *H02M 1/0095* (2021.05); *H02M 7/483* (2013.01); *H02M 7/4833* (2021.05); *H02M 7/4835* (2021.05); *H02J 3/46* (2013.01); *H02J 7/345* (2013.01); *H02J 2207/20* (2020.01); *H02J 2207/50* (2020.01); *H02J 2300/28* (2020.01); *H02M 1/36* (2013.01)

(56) References Cited

U.S. PATENT DOCUMENTS

| | | | | |
|---|---|---|---|---|
| 2014/0268928 | A1* | 9/2014 | Wei | H02M 5/458 363/37 |
| 2014/0376287 | A1* | 12/2014 | Narimani | H02M 7/483 363/60 |
| 2015/0200602 | A1* | 7/2015 | Narimani | H02M 7/4837 363/37 |
| 2016/0111967 | A1* | 4/2016 | Wei | H02M 5/458 363/35 |
| 2016/0211762 | A1 | 7/2016 | Cheng et al. | |
| 2022/0069726 | A1* | 3/2022 | Bhupathi | H02J 3/381 |
| 2022/0311354 | A1* | 9/2022 | Gerçek | H02M 7/5395 |

FOREIGN PATENT DOCUMENTS

| | | | | |
|---|---|---|---|---|
| EP | 3961900 A1 * | 3/2022 | | H02J 3/01 |
| WO | WO-2017000984 A1 * | 1/2017 | | G05B 11/012 |
| WO | 2017102033 A1 | 6/2017 | | |
| WO | 2021052546 A1 | 3/2021 | | |
| WO | WO-2021052547 A1 * | 3/2021 | | H02J 3/381 |

OTHER PUBLICATIONS

Keyan Shi et al: "A novel start-up scheme for modular multilevel converter," Energy Concersion Congress and Exposition (ECCE), 2012 IEEE, IEEE, Sep. 15, 2012 (Sep. 15, 2012), pp. 4180-4187.
PCT, Written Opinion of the International Searching Authority for Application PCT/DK2020/050256 dated Oct. 30, 2020.
Danish Patent and Trademark Office, 1st Technical Examination including the Search Report and Search Opinion for Application PA 2019 70576 dated Apr. 17, 2020.

* cited by examiner

MODULAR MULTILEVEL CONVERTER PRE-CHARGING

BACKGROUND

Field of the Invention

Embodiments presented in this disclosure generally relate to Modular Multilevel Converters (MMCs) and the capacitors included therein. Particular embodiments herein describe pre-charging schema for the capacitors.

Description of the Related Art

Wind Turbine Generators (WTGs) are an increasing popular source for generating electricity and may be deployed singly or in groups of several wind turbines, often referred to as a wind farm. In WTGs and other power generating or consuming systems connected to a power grid or distribution line, MMCs can be used to electrically link the two powered systems running different voltage/current schemas. When initiating a link between two powered systems, the MMC equalizes the differences in voltages/currents between the two systems to reduce power surges (e.g., inrush current from the higher voltage side to the lower voltage side) and other aberrant effects. For example, in a WTG, an MMC can equalize the difference via a DC (Direct Current) link located between the machine side converter (MSC) and line side converter (LSC) that is charged to a predefined level before contact is made via a series of charging components (e.g., one or more transformers, diode bridges, current limiter resistors, fuses, circuit breakers, switches, etc.)

SUMMARY

One embodiment of the present disclosure is a method comprising; driving a bypass current from an auxiliary power source through a plurality of bypass switches included in a corresponding plurality of cells; in response to a summed voltage across a plurality of cell capacitors included in the plurality of cells satisfying a drive threshold, driving an insert current through a plurality of insert switches included in the plurality of cells; and in response to a voltage across a DC link capacitor satisfying a pre-charge threshold when driving the insert current, opening a circuit breaker connecting the auxiliary power source with the plurality of cells and connecting a generator with external power line rails between which the DC link capacitor is connected, wherein driving the bypass current includes tuning (525) a rate at which individual bypass switches switch to equalize charges in the plurality of cell capacitors as the cell capacitors charge; and wherein driving the insert current includes tuning (545) a rate at which individual insert switches switch to equalize charges in the plurality of cell capacitors as the cell capacitors discharge.

In one embodiment, in combination with any method described above or below, driving the current includes tuning a rate at which individual bypass switches switch to equalize charges in the plurality of cell capacitors as the cell capacitors charge; and driving the insert current includes tuning a rate at which individual insert switches switch to equalize charges in the plurality of cell capacitors as the cell capacitors discharge.

In one embodiment, in combination with any method described above or below, the method further comprises, while driving at least one of the bypass current and the insert current, measuring a difference in voltage level of each of the cell capacitors of the plurality of cell capacitors; and in response to the difference exceeding difference threshold, stopping the auxiliary power source from charging the cell capacitors and the cell capacitors from charging the DC link capacitor.

In one embodiment, in combination with any method described above or below, the method further comprises, before driving the bypass current: closing the circuit breaker to link the auxiliary power source via a rectifier with a positive rail and a negative rail between which the DC link capacitor and the plurality of cells are connected; and circulating an initial current through the plurality of cells until a switch threshold voltage is reached in the plurality of cell capacitors.

In one embodiment, in combination with any method described above or below, the drive threshold exceeds a peak rectified voltage for the auxiliary power source.

In one embodiment, in combination with any method described above or below, the auxiliary power source is a multiphase source and each phase provided by the auxiliary power source simultaneously charges the plurality of cell capacitors while driving the bypass current.

In one embodiment, in combination with any method described above or below, the bypass switch is connected in parallel with a first flow diode and the insert switch is connected in parallel with a second flow diode, wherein the insert current flows through the first flow diode, and wherein the bypass current flows through the second flow diode.

One embodiment of the present disclosure is a controller for a Modular Multilevel Converter (MMC) including a plurality of cells connected in series between a positive rail and a negative rail and wherein each cell of the plurality of cells includes a bypass switch, an insert switch, and a cell capacitor, wherein the plurality of cells is connected in parallel to a Direct Current link capacitor, the controller configured to perform an operation comprising: driving a bypass current from an auxiliary power source through the bypass switches; in response to a summed voltage across the cell capacitors satisfying a drive threshold, driving an insert current from the cell capacitors through the insert switches; and in response to a voltage across the DC link capacitor satisfying a pre-charge threshold, opening a circuit breaker connecting the auxiliary power source to a rectifier and connecting a wind turbine generator, via the positive rail and negative rail, to an external power line, wherein driving the bypass current includes tuning (525) a rate at which individual bypass switches switch to equalize charges in the plurality of cell capacitors as the cell capacitors charge; and wherein driving the insert current includes tuning (545) a rate at which individual insert switches switch to equalize charges in the plurality of cell capacitors as the cell capacitors discharge.

In one embodiment, in combination with any controller described above or below, the operation further comprises: driving the bypass current includes tuning a rate at which individual bypass switches switch to equalize charges in the cell capacitors as the cell capacitors charge; and driving the insert current includes tuning a rate at which individual insert switches switch to equalize charges in the cell capacitors as the cell capacitors discharge.

In one embodiment, in combination with any controller described above or below, the operation further comprises: while driving at least one of the bypass current and the insert current, measuring a difference in voltage level of each of the cell capacitors; and in response to the difference exceeding difference threshold, stopping the auxiliary power source from charging the cell capacitors and the cell capacitors from charging the DC link capacitor.

In one embodiment, in combination with any controller described above or below, the operation further comprises, before driving the bypass current: closing the circuit breaker to link the auxiliary power source via the rectifier with the positive rail and the negative rail; and circulating an initial current through the cells until a switch threshold voltage is reached in the cell capacitors.

In one embodiment, in combination with any controller described above or below, the drive threshold exceeds a nominal voltage for the plurality of cells.

In one embodiment, in combination with any controller described above or below, the auxiliary power source is a multiphase source and each phase provided by the auxiliary power source simultaneously charges the cell capacitors while driving the bypass current.

In one embodiment, in combination with any controller described above or below, the bypass switch is connected in parallel with a first flow diode and the insert switch is connected in parallel with a second flow diode.

One embodiment of the present disclosure is a Modular Multilevel Converter (MMC), comprising: a positive rail,; a negative rail,; a Direct Current link, including a DC link capacitor, connected between the positive rail and the negative rail; a rectifier, connected between the positive rail and the negative rail, and selectively connected to an auxiliary power source of a Wind Turbine Generator (WTG), wherein the rectifier supplies DC power from the auxiliary power source on the positive rail and the negative rail having a rectified peak voltage below a pre-charge threshold for the DC link capacitor; a plurality of cells, connected in series between the positive rail and the negative ran, each cell of the plurality of cells comprising: a cell capacitor, connected between a first node and a second node; an insert switch, connected to the first node and a third node; a bypass switch, connected to the third node and the second node; a first flow diode, configured to allow current flow from the third node to the first node and prevent current flow from the first node to the third node; a second flow diode, configured to allow current flow from the second node to the third node and prevent current flow from the third node to the second node; and a gate controller, configured to control a voltage across the DC link capacitor and the cell capacitors by switching open and closed the first switches and the second switches to charge the cell capacitors beyond a nominal voltage and then switching open and closed the first switches and the second switches to discharge the cell capacitors to charge the DC link capacitors to the pre-charge threshold, to drive the bypass switch current includes tuning (525) a rate at which individual bypass switches switch to equalize charges in the plurality of cell capacitors as the cell capacitors charge, and to drive the insert switch current includes tuning (545) a rate at which individual insert switches switch to equalize charges in the plurality of cell capacitors as the cell capacitors discharge.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

An MMC (Modular Multilevel Converter) and a novel control schema thereof are provided herein that allows for the omission of additional charging components in the DC (Direct Current) Link, which leads to fewer points of failure in an MMC, lower operational and deployment footprints, simplified maintenance, and greater system reliability. DC Link capacitors in the MMC, rather than being charged via transformers and rectifiers supplied from the grid side, are charged using auxiliary power from the WTG (Wind Turbine Generator) or other power generating system in anticipation of connecting to a power grid. The auxiliary power overcharges the cell capacitors in the MMC to pre-charge the DC link capacitor to provide nominal voltages in the DC link capacitor and the cell capacitors to connect the WTG with the power grid via the MMC.

EXAMPLE EMBODIMENTS

Figure 1:
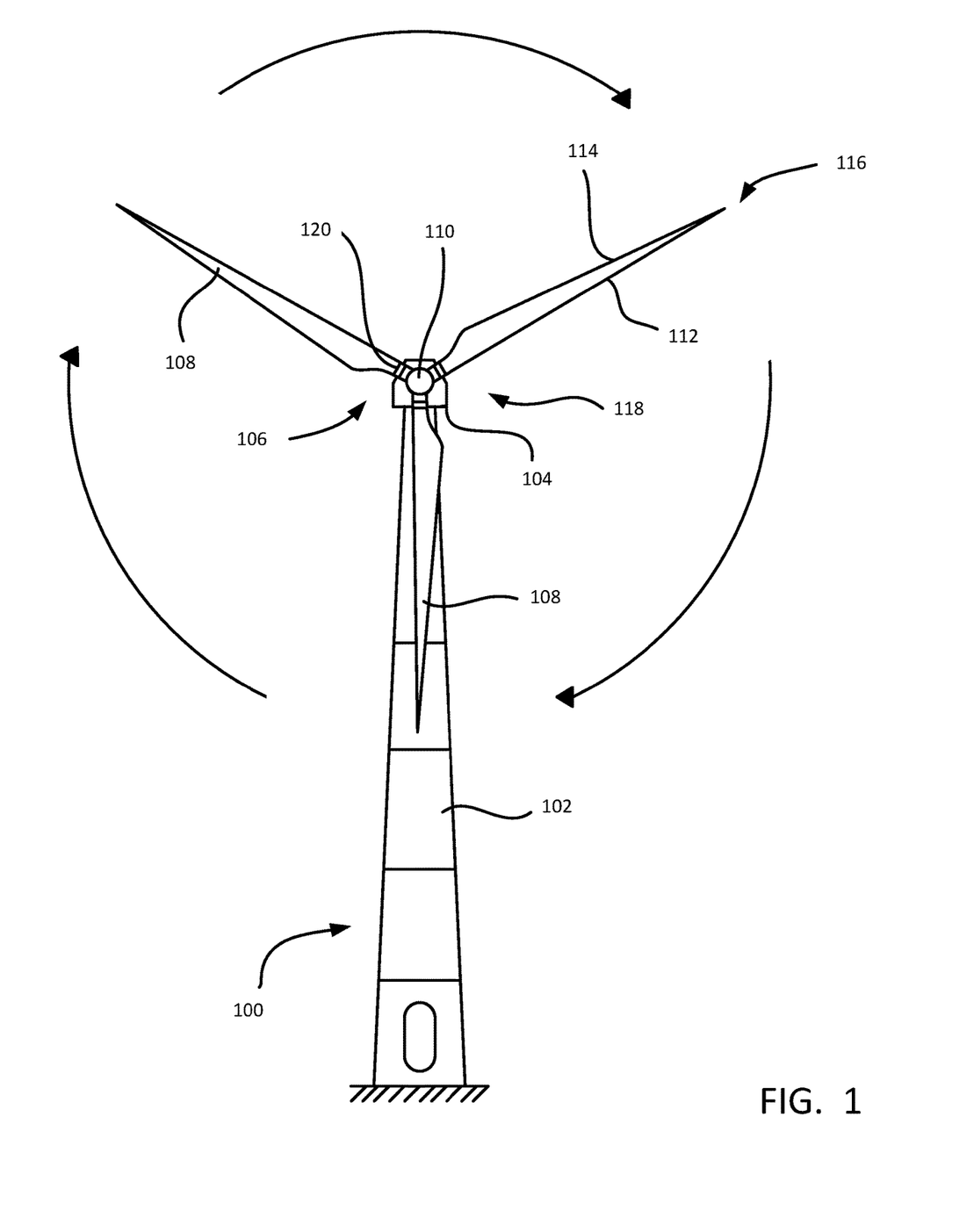
FIG. 1 illustrates a diagrammatic view of a wind turbine, according to an embodiment described in this present disclosure.

FIG. 1 illustrates a diagrammatic view of a horizontal-axis WTG 100. The WTG 100 typically comprises a tower 102 and a wind turbine nacelle 104 located at the top of the tower 102. A wind turbine rotor 106 may be connected with the nacelle 104 through a low speed shaft extending out of the nacelle 104. The wind turbine rotor 106 comprises three rotor blades 108 mounted on a common hub 110 which rotate in a rotor plane, but may comprise any suitable number of blades, such as one, two, four, five, or more blades. The blades 108 (or airfoil) typically each have an aerodynamic shape with a leading edge 112 for facing into the wind, a trailing edge 114 at the opposite end of a chord for the blades 108, a tip 116, and a root 118 for attaching to the hub 110 in any suitable manner.

For some embodiments, the blades 108 may be connected to the hub 110 using pitch bearings 120 such that each blade 108 may be rotated around its longitudinal axis to adjust the blade's pitch. The pitch angle of a blade 108 relative to the rotor plane may be controlled by linear actuators, hydraulic actuators, or stepper motors, for example, connected between the hub 110 and the blades 108.

Figure 2:
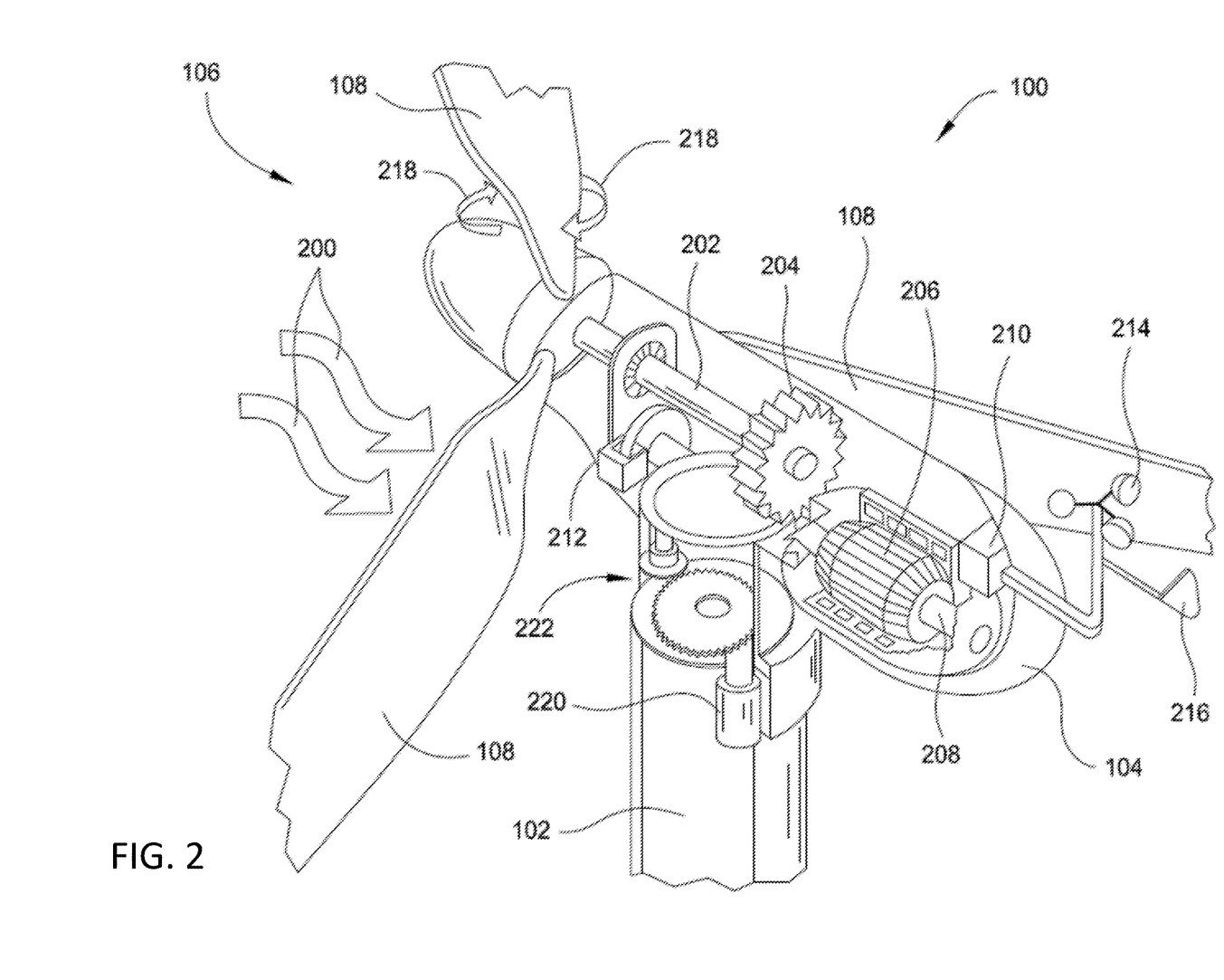
FIG. 2 illustrates a diagrammatic view of the components internal to the nacelle and tower of a wind turbine, according to an embodiment described in this present disclosure.

FIG. 2 illustrates a diagrammatic view of typical components internal to the nacelle 104 and tower 102 of a WTG 100. When the wind 200 pushes on the blades 108, the rotor 106 spins and rotates a low-speed shaft 202. Gears in a gearbox 204 mechanically convert the low rotational speed of the low-speed shaft 202 into a relatively high rotational speed of a high-speed shaft 208 suitable for generating electricity using a generator 206.

A controller 210 may sense the rotational speed of one or both of the shafts 202, 208. If the controller decides that the shaft(s) are rotating too fast, the controller may signal a braking system 212 to slow the rotation of the shafts, which slows the rotation of the rotor 106—i.e., reduces the revolutions per minute (RPM). The braking system 212 may prevent damage to the components of the WTG 100. The controller 210 may also receive inputs from an anemometer 214 (providing wind speed) and/or a wind vane 216 (providing wind direction). Based on information received, the controller 210 may send a control signal to one or more of the blades 108 in an effort to adjust the pitch 218 of the blades. By adjusting the pitch 218 of the blades with respect to the wind direction, the rotational speed of the rotor (and therefore, the shafts 202, 208) may be increased or decreased. Based on the wind direction, for example, the controller 210 may send a control signal to an assembly comprising a yaw motor 220 and a yaw drive 222 to rotate the nacelle 104 with respect to the tower 102, such that the rotor 106 may be positioned to face more (or, in certain circumstances, less) upwind.

Figure 3A:
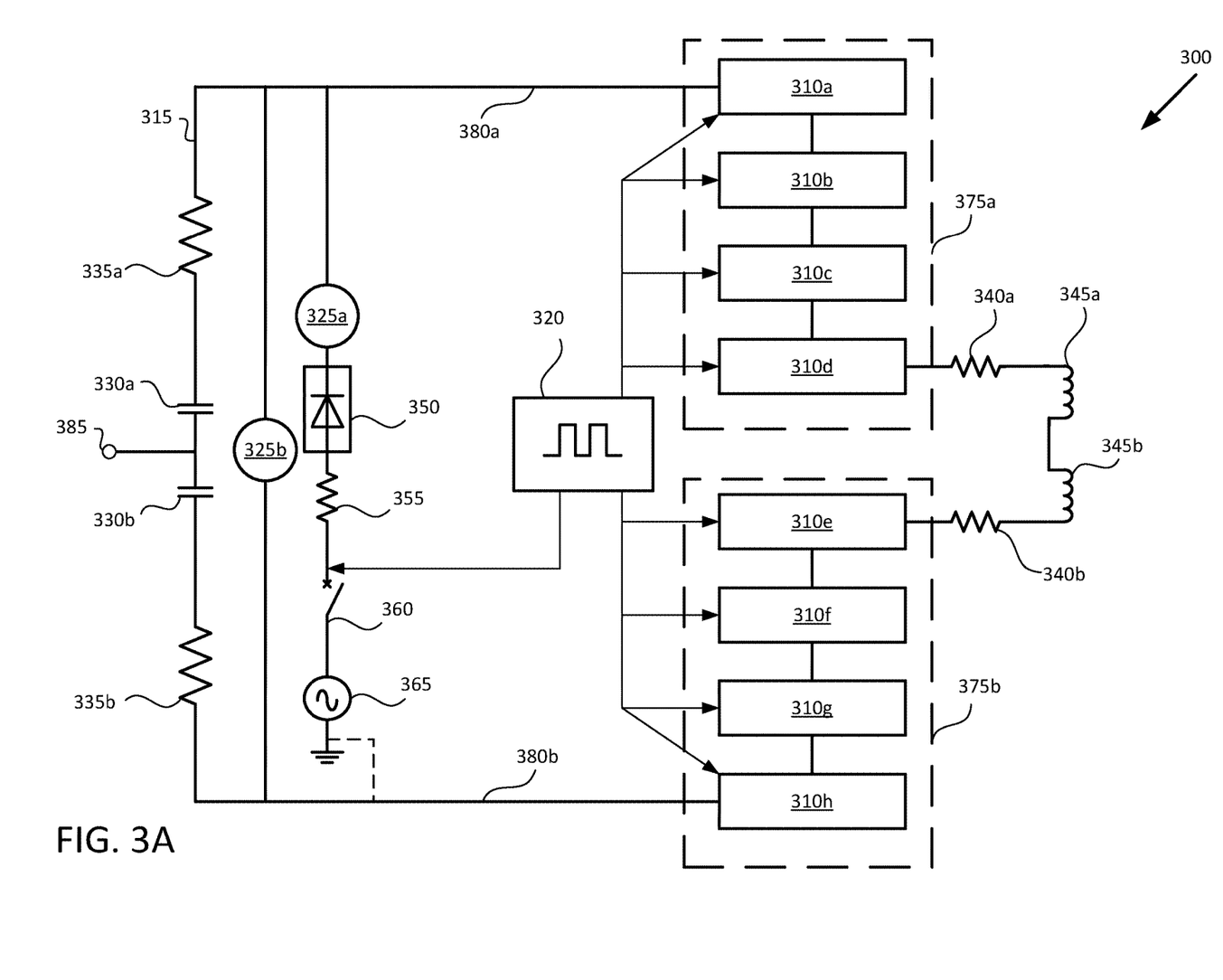
FIGS. 3A and 3B illustrate component layouts and circuit diagrams in a Modular Multilevel Converter, according to embodiments of the present disclosure.
Figure 3B:
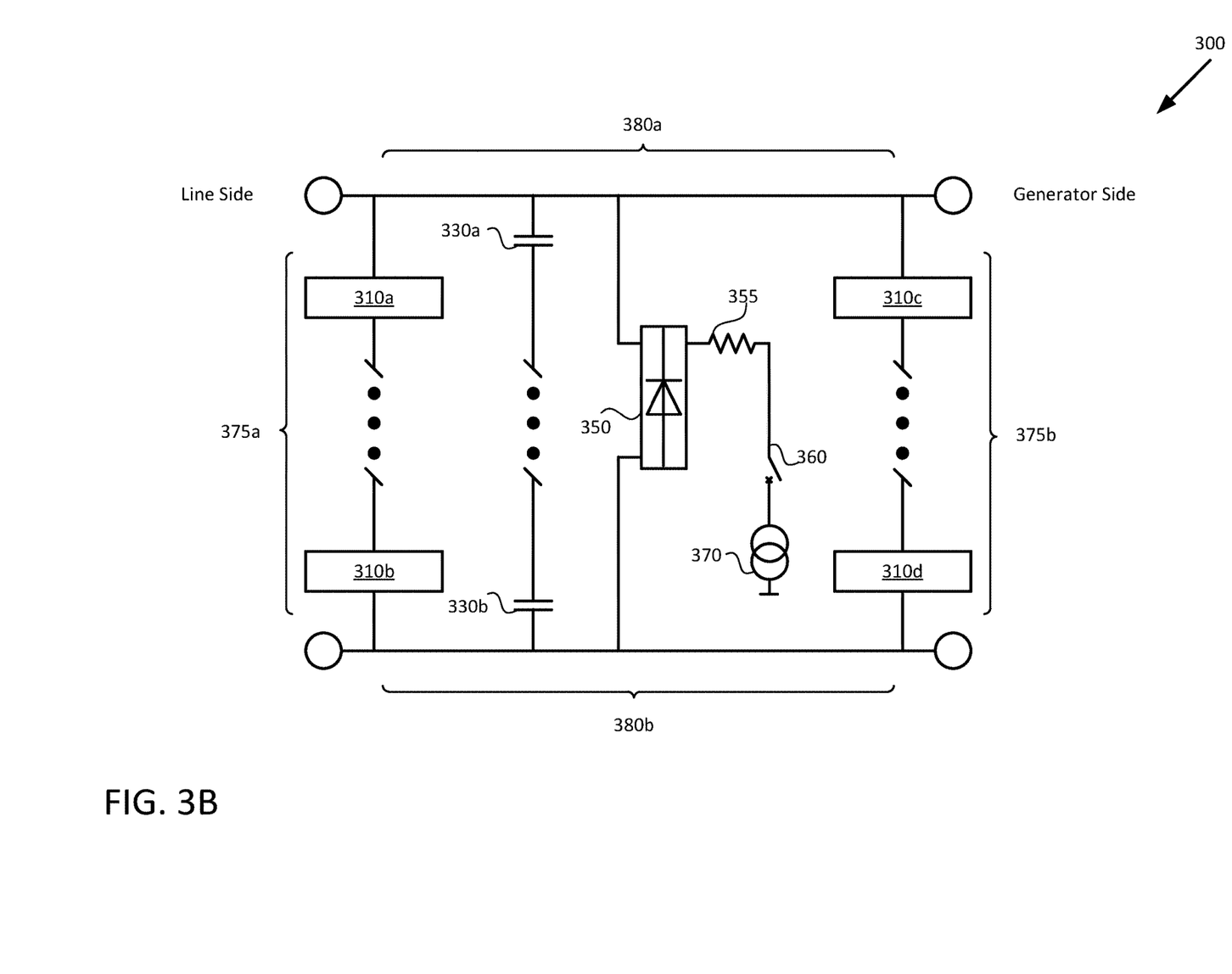

FIGS. 3A and 3B illustrate component layouts in an MMC 300, according to embodiments of the present disclosure. Although illustrated as a single phase layouts, one of ordinary skill in the art will appreciate that the MMCs 300 may be applied to multiphase layouts, such as for use with a three-phase WTG 100 or other system generating or consuming power from a linked three-phase power grid or distribution line. Regardless of the number of phases, the MMC 300 includes one common DC link 315.

The MMC 300 generally comprises a plurality of cells 310a-h (generally, cells 310) connected in series as part of a phase leg coupled to a DC link 315. The cells 310 included in a given MMC 300 are modular, and a fabricator can include more or fewer cells as needed for a particular application. Each cell 310 may include (or may be included in) one or more separate power modules which include some or all of circuitry of the cell 310. The circuitry of a cell 310 is discussed in greater detail in regard to FIG. 4. The cells 310 are modular in nature, and each cell 310 can have the same, or substantially the same, physical footprint or input/output interface as the other cells 310 in an MMC 300. The modules can therefore be substituted or swapped out to meet the needs of a particular deployment and individually repaired or replaced as needed.

A gate controller 320 (including various sub-controllers thereof) controls the operation of the cells 310 and circuit breaker 360 (or other switch). The gate controller 320 drives various powered switching components in the cells 310 and a circuit breaker 360 that connects an auxiliary power source 365 to a rectifier 350 to pre-charge one or more DC link capacitors 330a-b (generally, DC link capacitor 330). The gate controller 320 monitors various probes 325a-b (e.g., a current probe 325a on the rectifier 350, a voltage probe 325b across the DC link capacitors 330, voltage probes across capacitors in the cells 310) to regulate the charging and discharging of various capacitors when pre-charging the MMC 300.

The DC link 315 is provided between two voltage rails 380, which are individually referred to as a positive voltage rail 380a and a negative voltage rail 380b. Some of the cells 310 define a Line Side Converter (LSC) 375a that is generally connected to a power grid or distribution line (e.g., cells 310a-b in FIG. 3B), while a different group of cells 310 (e.g., cells 310c-d in FIG. 3B), define a Machine Side Converter (MSC) 375b that is generally connected to a generator, such as a WTG 100, when the MMC 300 is active (e.g., not pre-charging). When pre-charging the DC link capacitors 330, the rails 380 may be disconnected from the power distribution line and the generator to isolate the cells 310 from a power grid or distribution line and to control how the auxiliary power source 365 charges the DC link capacitors 330. Stated differently, the LSC 375a is disconnected from the grid and the MSC 375b is disconnected from the generator when pre-charging the DC link capacitors 330. As illustrated in FIG. 3A, the DC link 315 may include a central node 385 between the rails 380. Additionally, MMC 300 can conceptually be divided into "upper" and "lower" arms and elements based on the components being connected to either the positive rail 380a (e.g., as an "upper" cell 310) or the negative rail 380b (e.g., as a "lower" cell) respectively, from phase (output) terminals of MMC 300.

FIG. 3A illustrates various resistances and inductances that can be inherent to the lines and circuit arrangements or purposely calibrated to known values via installed resistors and inductors, whereas FIG. 3B illustrates an idealized circuit arrangement in which the resistances (except for the pre-charge current limiting resistor 355) and inductances are omitted for ease of understanding. As shown in FIG. 3A, DC link resistances 335a-b (for resistances 335 on the positive rail 380a and negative rail 380b, respectively) are illustrated on the DC link 315, and intra-converter resistances 340a-b and arm inductances 345a-b are illustrated between the cells 310d-e. Both FIGS. 3A and 3B illustrate a current limiter resistor 355 between the circuit breaker 360 and the rectifier 350, which is provided to cap the current and voltage levels provided through the rectifier 350 to the rails 380. In various embodiments, the negative rail 380b is connected to ground, although the negative rail 380b can be isolated from ground in other embodiments for purposes of voltage insulation.

When the circuit breaker 360 is closed, the auxiliary power source 365 is connected to the rectifier line (which may be linked via a transformer 370 to the rectifier line, as per FIG. 3B) that includes the current limiter resistor 355 and the rectifier 350. The auxiliary power source 365 for pre-charging the MMC 300 can be the auxiliary power source of the WTG 100 or another AC power source (e.g., an external diesel generator, solar panel array, Uninterruptible Power Supply). By connecting the auxiliary power source 365 from the grid side of the MMC 300, and pre-charging the capacitors as described herein, a lower voltage level than the grid voltage (e.g., a low voltage 220 VAC power source 365 versus a 1 kVAC or higher grid voltage) can be used to prepare the MMC 300 for operations. The rectifier 350 converts the AC power generated by the auxiliary power source 365 into a DC power on the rails 380, which pre-charges various capacitors in the cells 310 and the DC link capacitors 330 as managed by the gate controller 320.

Figure 4:
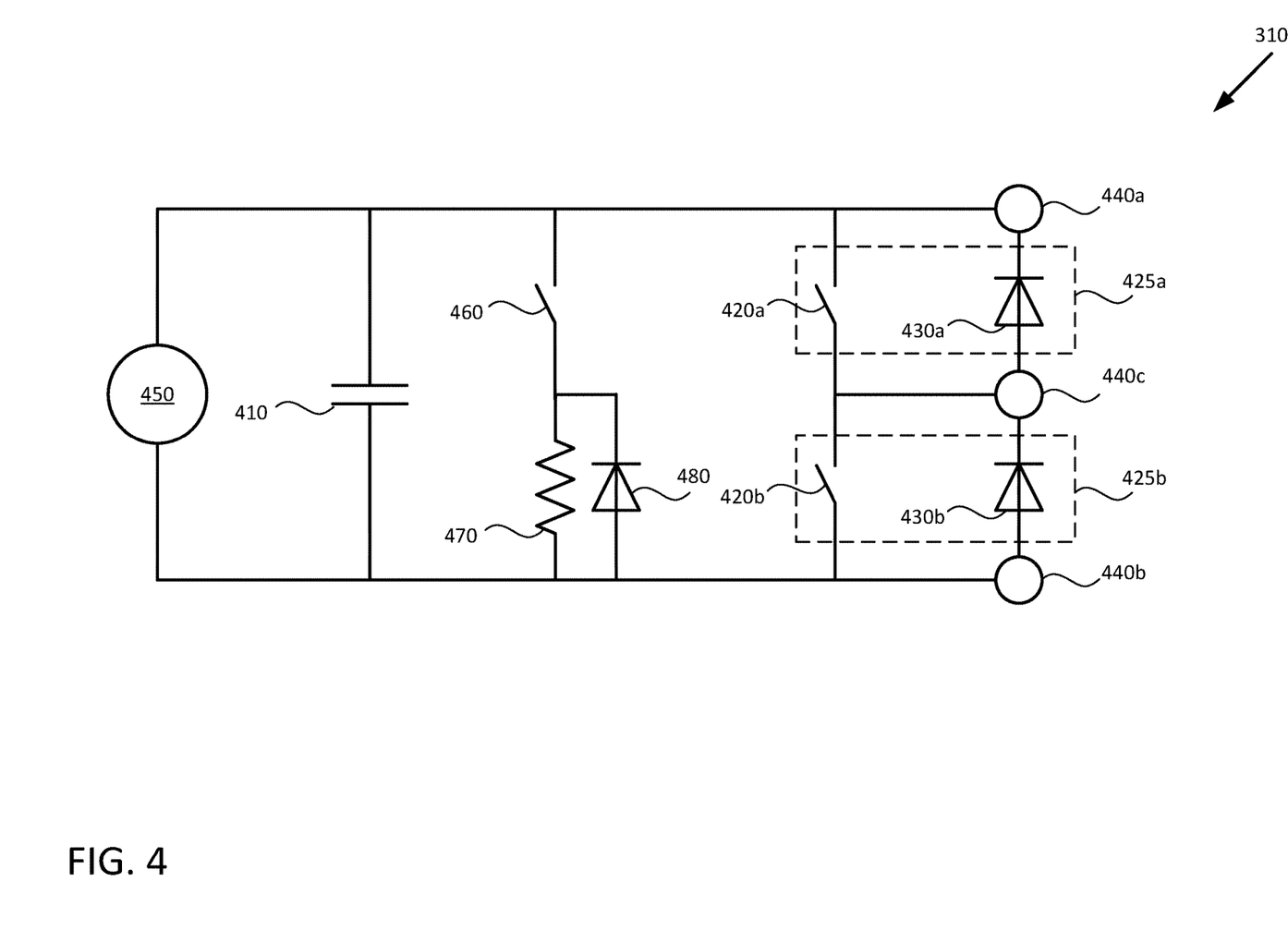
FIG. 4 illustrates the components of a cell, according to embodiments of the present disclosure.

FIG. 4 illustrates the components of a cell 310, according to embodiments of the present disclosure. FIG. 4 may be understood in conjunction with FIGS. 3A and 3B. Each cell 310 includes a cell capacitor 410, a first switch 420a (generally, switch 420), and a second switch 420b. Each switch 420 is arranged in parallel with a corresponding flow diode 430 (individually, first flow diode 430a and second flow diode 430b) that allow the flow of current in a given direction through the cell 310 when the corresponding switch 420 is open. The paired switches 420 and flow diodes 430 may be included in a single package or integrated component 425 (individually, first component 425a and second component 425b), and in various embodiments, the switches 420 may be included in an Insulated-Gate Bipolar Transistor (IGBT) or other power semiconductor device (e.g., a power Metal Oxide Semiconductor Field Effect Transistor (MOSFET) or Bipolar Junction Transistor (BJT)). The gate controller 320 (not illustrated) can thereby control whether a given switch 420 is open or closed by controlling the gate of the associated power semiconductor device.

In embodiments using a power semiconductor device, the flow diode 430 can be installed as an anti-parallel diode that permits current flow from the emitter side towards the collector side of the switch 420 and that blocks current flow from the collector side to the emitter side. Consider then, the cell 310 having a first node 440a and a second node 440b between which the cell capacitor 410 is connected in parallel to the switches 420. The first switch 420a would therefore be connected between the first node 440a and a third node 440c, and the second switch 420b would be connected between the third node 440c and the second node 440b. The corresponding flow diodes 430 allow current to flow from the second node 440b to the third node 440c and from the third node 440c to the first node 440a and prevent current flow from the first node 440a to the third node 440c and from the third node 440c to the second node 440b.

A voltage probe 450 across the cell capacitor 410 (e.g., connected to the first node 440a and the second node 440b) measures a charge state of the cell capacitor 410. The gate controller 320 uses the charge state for individual cells 310 as well as the aggregated or summed charge state for all of the cells 310 to manage when and how frequently to open and close the switches 420 in the cells 310 for pre-charging the DC link capacitor 330 (not illustrated) as well as the cell capacitors 410.

When using the cells 310 illustrated in FIG. 4 as single-capacitor cells 310, each cell 310 can be connected in series with other cells between the rails 380. With reference to FIG. 3A, the first cell 310a may be connected to the positive rail 380a by the third node 440c and by the second node 440b to the second cell 310b (at the corresponding third node 440c). Similarly, the second node 440b of the second cell 310b is connected to the third node 440c of the third cell 310c, the second node 440b of the third cell 310c is connected to the third node 440c of the fourth cell 310d, etc., until the second node 440b of the fourth cell 310d is connected to upper arm reactor 345a (or the representative resistance 340a thereof per FIG. 3A). The lower arm connection is similarly connected between the lower arm reactor 345b (or the representative resistance 340b thereof per FIG. 3A) and the negative rail 380b by the chained second nodes 440b and third nodes 440c. In this example arrangement, the second switches 420b act as bypass switches to carry a bypass current to charge the cell capacitors 410 and the first switches 420a act as insert switches to discharge the cell capacitors 410 to charge the DC link capacitors 330.

When arranging the cells 310 illustrated in FIG. 4 to form dual-cell arrangements (in which each cell 310 includes two capacitors, each cell 310 can be connected in series with other cells 310 between the rails 380. With reference to FIG. 3A, a first cell 310a may be connected to the positive rail 380a by the corresponding third node 440c, and to the first node 440a of the second cell 310b via the second node 440b of the first cell 310a, The second cell 310b in turn is connected to the third cell 310c via the corresponding third nodes 440c. The third cell 310c in this example can be connected to the fourth cell 310d via the second node 440b of the third cell 310c and the first node 440a of the fourth cell 410d. The cells 310 may thus alternate in connection schema (third-to-third node or second-to-first) until an fourth/final cell 310d in the upper arm is connected to the upper reactor 345a and/or resistance 340a, and similarly, the cells 310e-h of the lower arm are connected between the lower arm reactor 345b (or the representative resistance 340b thereof per FIG. 3A) and the negative rail 380b by the alternating connection schema. In this example arrangement, in half of cells 310 the first switches 420a act as bypass switches to carry a bypass current to charge the cell capacitors 410 and the second switches 420b act as insert switches to discharge the cell capacitors 410 to charge the DC link capacitors 330. In the other half of the cells in the example arrangement, the second switches 420b act as bypass switches to carry a bypass current to charge the cell capacitors 410 and the first switches 420a act as insert switches to discharge the cell capacitors 410 to charge the DC link capacitors 330. One of skill in the art will appreciate that more or fewer than eight cells 310 may be employed in an MMC 300.

In some embodiments, a discharge line is defined between the first node 440a and the second node 440b that includes a discharge switch 460 and a discharge resistor 470. The discharge switch 460 can include various power semiconductor devices that are controlled by the gate controller 320 to selectively open and dose. When the discharge switch 460 is dosed, the discharge line forms a circuit with the cell capacitor 410 and the discharge resistor 470, which allows energy stored in the cell capacitor 410 to be discharged within the cell 310 (also referred to as being "bled off"). A freewheel diode 480 is included in parallel with the discharge resistor 470 to reduce voltage overshoot after turn-off of the discharge switch 460, when discharging the cell capacitor 410. The gate controller 320 may discharge the cell capacitor 410 via the discharge resistor 470 in preparation for maintenance or inspection of the cell 310, when the voltage across the cell capacitor 410 exceeds a predefined threshold, to equalize charge in the cell capacitor 410 of one cell 310 with the charge in another cell 310, etc.

Figure 5:
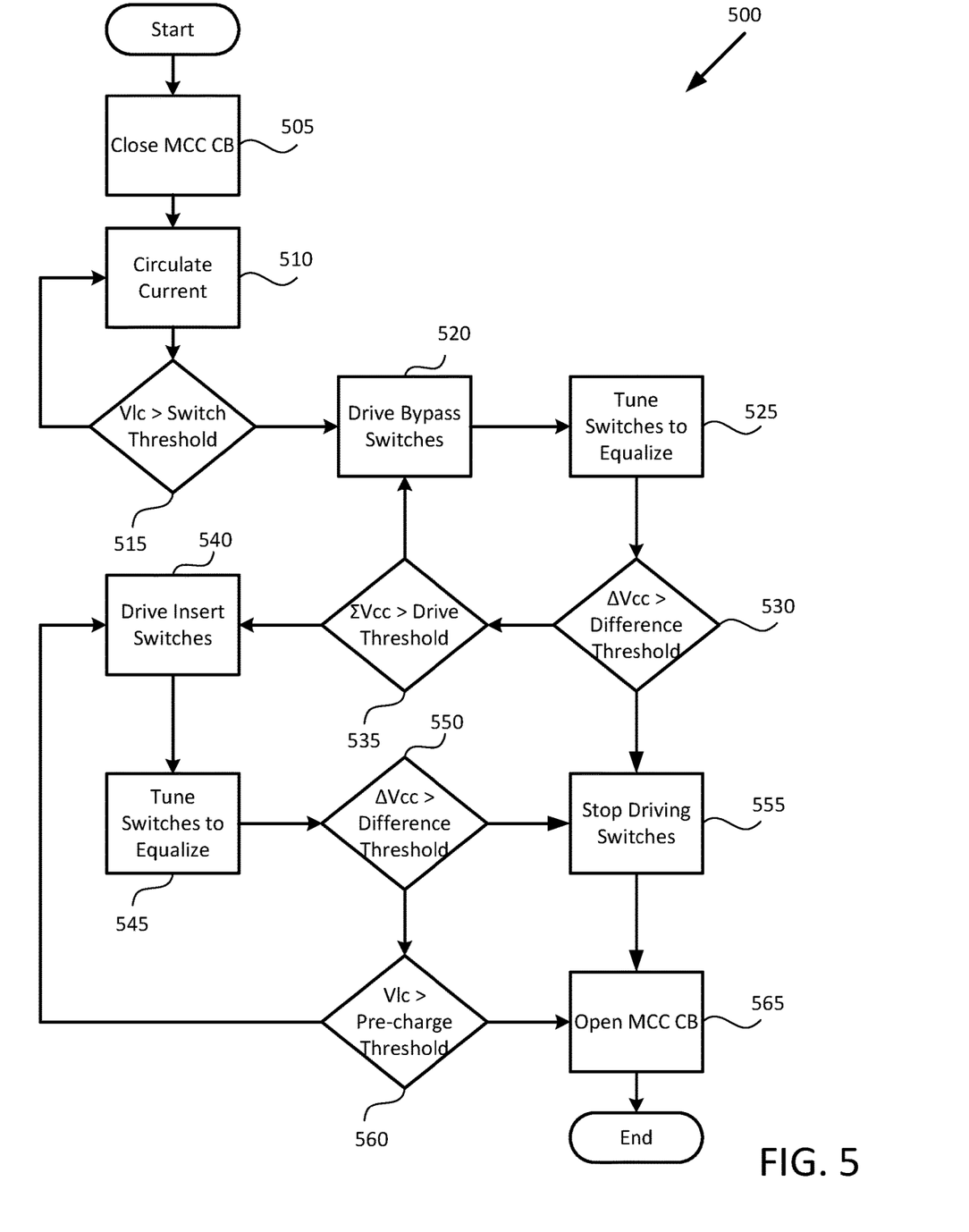
FIG. 5 is a flowchart of a proposed method for pre-charging a Modular Multilevel Converter, according to embodiments of the present disclosure.

FIG. 5 is a flowchart of a proposed method 500 for pre-charging an MMC 300, according to embodiments of the present disclosure. Method 500 begins with block 505, where the gate controller 320 closes the circuit breaker (CB) 360 to make contact with the auxiliary power source 365 and the rectifier 350. Connecting the auxiliary power source 365 with the rectifier 350 produces a DC voltage on the rails 380, and causes (per block 510) a DC current to circulate through the MMC 300 for pre-charging the DC link capacitors 330.

The gate controller 320 monitors the voltage ($V_{lc}$) across the DC link capacitors 330. When at block 515 the voltage $V_{lc}$ exceeds a switch threshold, method 500 continues to block 520. Otherwise method 500 returned to block 510 to continue circulating current through the DC link capacitors 330. In various embodiments, the switch threshold is equal to the rectified peak voltage for the auxiliary power source 365, and in other embodiments may be a predefined value of the rectified peak voltage (e.g., x % of the peak). The rectified peak voltage is often less than the nominal voltage for the MMC 300, and the charge level in the DC link capacitors 330 should exceed the rectified peak voltage to avoid current inrush and other aberrant effects when establishing a connection via the MMC 300 between the two systems. Because the DC voltage on the rails 380 is based on the rectified peak voltage for the auxiliary power source 365, the charge level in the DC link capacitors 330 cannot exceed the rectified peak voltage unless a boost action is performed, Therefore, once the voltage $V_{lc}$ across the DC link capacitors 330 exceeds the switch threshold, method 500 proceeds to block 520 to begin the boost action.

At block 520, the gate controller 320 drives the bypass switches 420 in the cells 310 to charge the cell capacitors 410 therein. The frequency at which the gate controller 320 drives the bypass switches 420 (i.e., cycles between open and closed states) is based on the RLC (Resistive, Inductive, Capacitive) characteristics of the MMC 300 and a desired charging speed. When the bypass switches 420 are closed, the bypass current flows through the cells 310 and charge the arm inductances/reactors 345. When the bypass switches 420 are opened, the reactor current stored in the arm inductances 345 decays, and flows through the flow diodes 430 to charge the cell capacitors 410. The gate controller 320 can vary the duty cycle and frequency of open/closed periods to optimize the charging speed demand and the charge level demand. When used in a multiphase MMC 300, the gate controller 320 can drive the bypass switches 420 of each phase according to the associated phase of power provided from the auxiliary power source 365 to simultaneously charge the cell capacitors 410 in all of the phases.

In one embodiment, the gate controller 320 monitors the charges in the individual cell capacitors 410 and (optionally) at block 525 tunes the switching rates of various individual bypass switches 420 to control the rate at which the cell capacitors 410 are charged. In various embodiments, the gate controller 320 may keep the bypass switches 420 open for longer for cell capacitors 410 charging too quickly, may keep the bypass switches 420 closed for longer for cell capacitors 410 charging too slowly, or both, Thus, the gate controller 320 can compensate for any charging unbalances that may occur in the cell capacitors 410 due to the different tolerances of the circuit components, such as, for example, the capacitance of the cell capacitor 410, resistances in the switches 420, parasitic resistances, etc.

The gate controller 320 also monitors the relative difference in charge level of individual cell capacitors 410 ($\Delta V_{cc}$) compared to the average (mean or median) charge level of all of the cell capacitors 410. At block 530, when any of the cells 310 exhibit a charge in an associated cell capacitor 410 above or below a difference threshold from the average value (e.g., x % higher than the average charge), method 500 proceeds to block 555, where the gate controller 320 stops driving the bypass switches 420. Otherwise, method 500 proceeds to block 535, where the gate controller 320 also monitors the collective, or summed, charge level ($\Sigma V_{cc}$) of the cell capacitors 410. At block 535, when the collective charge level $\Sigma V_{cc}$ is less than a drive threshold, method 500 returns to block 520 for the gate controller 320 to continue driving the bypass switches 420 to charge the cell capacitors 410. The gate controller 320 continues to drive the bypass switches 420 (per block 520) until the collective charge level $\Sigma V_{cc}$ satisfies the drive threshold. The drive threshold is set according to the total charge capacity of the cell capacitors 410 relative to the DC link capacitors 330. In a single phase MMC 300, the drive threshold may be set between 2-5% higher than the nominal charge voltage for the cell capacitors 410 depending on the ratio of equivalent capacitances of the DC link capacitors 330 to the equivalent capacitance of all cell capacitors 410. In a multiphase MMC 300, which typically includes more cell capacitors 410 than included in single phase MMCs 300, the drive threshold may accordingly be set lower than in a single phase MMC 300.

Method 500 proceeds to block 540 from block 535 when the collective charge level $\Sigma V_{cc}$ satisfies the drive threshold, where the gate controller 320 starts driving the insert switches 420 to charge the DC link capacitors 330 from the cell capacitors 410. At block 540, the gate controller 320 drives the insert switches 420 in the cells 310 to discharge the cell capacitors 410 therein to pre-charge the DC link capacitors 330 above the rectified peak voltage. The frequency at which the gate controller 320 drives the insert switches 420 (i.e., cycles between open and closed states) is based on the RLC characteristics of the MMC 300 and a desired charging/discharging speed. When the insert switches 420 are closed, the insert current flows from the cells 310 and charges the DC link capacitors 330. When the insert switches 420 are open, the cell capacitors 410 maintain charge. The gate controller 320 can vary the duty cycle and frequency of open/closed periods to optimize the discharging speed and the current produced on the rails 380. When used in a multiphase MMC 300, the gate controller 320 can drive the insert switches 420 of each phase simultaneously to charge the DC link capacitors 330.

The gate controller 320 monitors the charges in the individual cell capacitors 410 and (optionally) at block 545 tunes the duty cycles of various individual insert switches 420 to control the rate at which the cell capacitors 410 are discharged, In various embodiments, the gate controller 320 may keep the insert switches 420 open for longer for cell capacitors 410 discharging too quickly, may keep the bypass switches 420 closed for longer for cell capacitors 410 discharging too slowly, or both.

At block 550, the gate controller 320 also monitors the relative difference in charge level of individual cell capacitors 410 ($\Delta V_{cc}$) compared to the average (mean or median) charge level of all of the cell capacitors 410. In some embodiments, the difference threshold used in block 550 is the same as the difference threshold used in block 535, but may be different in other embodiments. When any of the cells 310 exhibit a charge in an associated cell capacitor 410 above or below a difference threshold from the average value (e.g., x % higher than the average charge), method 500 proceeds to block 555, where the gate controller 320 stops driving the insert switches. Otherwise, method 500 proceeds to block 560, where the gate controller 320 also monitors the charge level $V_{lc}$ of the DC link capacitors 330 while driving the insert switches 420.

At block 560, when the charge level $V_{lc}$ of the DC link capacitors 330 is less than a pre-charge threshold, method 500 returns to block 540 for the gate controller 320 to continue driving the insert switches 420 to charge the DC link capacitors 330 from the cell capacitors 410. The gate controller 320 continues to drive the insert switches 420 (per block 540) until the charge level $V_{lc}$ of the DC link capacitors 330 satisfies the pre-charge threshold. In a three phase MMC 300, the sum of the voltages across the cell capacitors 410 of all phases can be at least twice the pre-charge threshold, Otherwise, method 500 proceeds to block 565 from block 560 when the charge level $V_{lc}$ of the DC link capacitors 330 satisfied the pre-charge threshold for the gate controller 320 to end pre-charging actions and to open the circuit breaker 360 to disconnect the auxiliary power source 365 from the rails 380.

At block 555, in response to identifying a charge imbalance during charging (per block 530) or during discharging (per block 550) of the cell capacitors 410 that exceeds a difference threshold that the gate controller 320 can compensate for by altering the switching rate, the gate controller 320 stops driving the switches 420 in the cells 310; leaving all of the switches 420 open. Additionally, the gate controller 320 generates an alert or maintenance message and optionally activates a discharge line to discharge the cell capacitors 410. Method 500 then proceeds to block 565 to ensure that the circuit breaker 360 is open and the auxiliary power source 365 is disconnected from the MMC 300. Method 500 may then conclude.

In various embodiments, the gate controller 320 may perform block 565 to open the circuit breaker 360 any time after fully charging the cell capacitors 410 (e.g., after a positive determination at block 535).

In various embodiments, after successfully charging the DC link capacitors 330 and ensuring the circuit breaker 360 is open (per block 565), the gate controller 320 or another control device may cause various circuit breakers or switches to connect the generator (e.g., WTG 100) to the cells 310 comprising an MSC and to connect the external power line to the cells 310 comprising an LSC to link the generator to the grid or power distribution line via the rails 380. Method 500 may then conclude.

Figure 6:
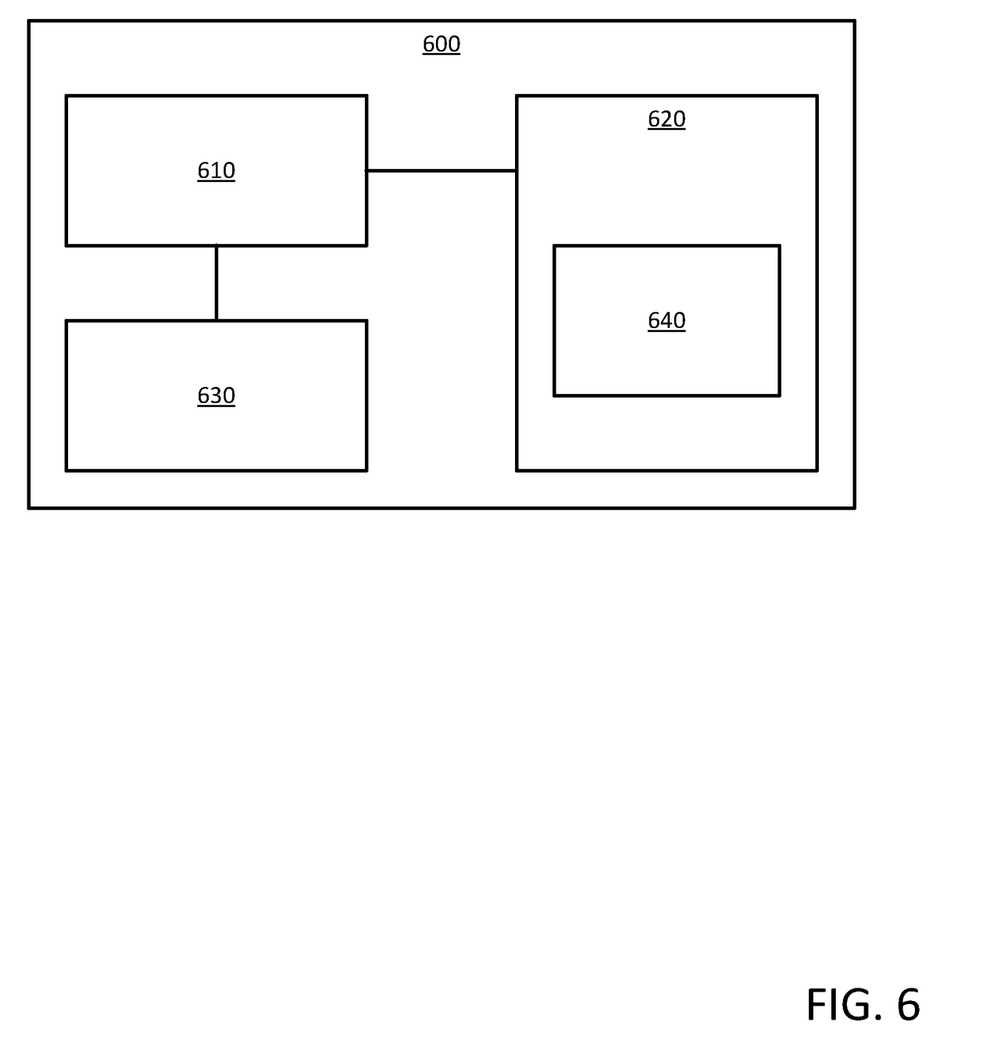
FIG. 6 is a block diagram of a controller unit as may be used as a gate controller, according to one or more embodiments of the present disclosure.

FIG. 6 is a block diagram of a controller unit 600 as may be used as a gate controller 320, according to one or more embodiments. The controller unit 600 includes one or more computer processors 610 and a memory 620. The one or more processors 610 represent any number of processing elements that each can include any number of processing cores. The memory 620 can include volatile memory elements (such as random access memory), non-volatile memory elements (such as solid-state, magnetic, optical, or Flash-based storage), and combinations thereof. Moreover, the memory 620 can be distributed across different mediums (e.g., network storage or external hard drives).

As shown, the one or more processors 610 are communicatively coupled with a communication system 630 to send/receive communication via fiber optic cables, electrical wires, and/or radio signals with various probes 325/450 and other controller units 600 associated with the WTG 100 or other auxiliary power source 365.

The memory 620 may include a plurality of "modules" for performing various functions described herein. In one embodiment, each module includes program code that is executable by one or more of the processors 610. However, other embodiments may include modules that are partially or fully implemented in hardware (i.e., circuitry) or firmware. The memory 620 includes a pre-charging control logic 640 that enables the controller unit 600 to optimize the charging of the DC link capacitors 330 via the auxiliary power source 365 as described herein. In some embodiments, the pre-charging control logic 640 is preloaded with setpoints and thresholds for various control schemes, such as are described in relation to FIG. 5 by way of example.

In the preceding, reference is made to embodiments presented in this disclosure. However, the scope of the present disclosure is not limited to specific described embodiments. Instead, any combination of the features and elements provided above, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

The present invention may be a system, a method, and/or a computer program product. The computer program product may include a computer-readable storage medium (or media) (e.g., a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing) having computer readable program instructions thereon for causing a processor to carry out aspects of the present invention.

Aspects of the present disclosure are described with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

The invention claimed is:

1. A method comprising:
   driving a bypass current from an auxiliary power source through a plurality of bypass switches included in a corresponding plurality of cells;

in response to a summed voltage across a plurality of cell capacitors included in the plurality of cells satisfying a drive threshold, driving an insert current through a plurality of insert switches included in the plurality of cells; and in response to a voltage across a DC link capacitor satisfying a pre-charge threshold when driving the insert current, opening a circuit breaker connecting the auxiliary power source with the plurality of cells and connecting a generator with external power line rails between which the DC link capacitor is connected, wherein driving the bypass current includes tuning a rate at which individual bypass switches switch to equalize charges in the plurality of cell capacitors as the cell capacitors charge, and wherein driving the insert current includes tuning a rate at which individual insert switches switch to equalize charges in the plurality of cell capacitors as the cell capacitors discharge, and wherein the method further comprises:

while driving the bypass current, the insert current, or both, measuring a difference in voltage level of each of the cell capacitors of the plurality of cell capacitors; and in response to the difference exceeding a difference threshold, stopping the auxiliary power source from charging the cell capacitors and the cell capacitors from charging the DC link capacitor.

2. The method of claim 1, further comprising, before driving the bypass current:

closing the circuit breaker to link the auxiliary power source via a rectifier with a positive rail and a negative rail between which the DC link capacitor and the plurality of cells are connected; and circulating an initial current through the plurality of cells until a switch threshold voltage reached in the plurality of cell capacitors.

3. The method of claim 1, wherein the drive threshold exceeds a peak rectified voltage for the auxiliary power source.

4. The method of claim 1, wherein the auxiliary power source is a multiphase source and each phase provided by the auxiliary power source simultaneously charges the plurality of cell capacitors while driving the bypass current.

5. The method of claim 1, wherein the plurality of cells are arranged so that, for a given cell of the plurality of cells, a bypass switch of the plurality of bypass switches is connected in parallel with a first flow diode and an insert switch of the plurality of insert switches is connected in parallel with a second flow diode.

6. A controller for a Modular Multilevel Converter (MMC) including a plurality of cells connected in series between a positive rail and a negative rail and wherein each cell of the plurality of cells includes a bypass switch, an insert switch, and a cell capacitor, wherein the plurality of cells is connected in parallel to a Direct Current (DC) link capacitor, the controller configured to perform an operation comprising:

driving a bypass current from an auxiliary power source through the bypass switch of each of the plurality of cells;

in response to a summed voltage across the cell capacitors in the plurality of cells satisfying a drive threshold, driving an insert current from the cell capacitors through the insert switch of each of the plurality of cells; and in response to a voltage across the DC link capacitor satisfying a pre- charge threshold, opening a circuit breaker connecting the auxiliary power source to a rectifier and connecting a wind turbine generator, via the positive rail and negative rail, to an external power line, wherein driving the bypass current includes tuning a rate at which individual bypass switches switch to equalize charges in the plurality of cell capacitors as the cell capacitors charge; and wherein driving the insert current includes tuning a rate at which individual insert switches switch to equalize charges in the plurality of cell capacitors as the cell capacitors discharge, and wherein the operation further comprises while driving at least one of the bypass current and the insert current, measuring a difference in voltage level of each of the cell capacitors; and in response to the difference exceeding a difference threshold, stopping the auxiliary power source from charging the cell capacitors and the cell capacitors from charging the DC link capacitor.

7. The controller of claim 6, wherein the operation further comprises, before driving the bypass current:

closing the circuit breaker to link the auxiliary power source via the rectifier with the positive rail and the negative rail; and circulating an initial current through the plurality of cells until a switch threshold voltage is reached in the cell capacitors.

8. The controller of claim 6, wherein the drive threshold exceeds a nominal voltage for the plurality of cells.

9. The controller of claim 6, wherein the auxiliary power source is a multiphase source and each phase provided by the auxiliary power source simultaneously charges the cell capacitors while driving the bypass current.

10. The controller of claim 6, wherein the bypass switch is connected in parallel with a first flow diode and the insert switch is connected in parallel with a second flow diode, wherein the insert current flow through the first flow diode, and wherein the bypass current flows through the second flow diode.

11. A Modular Multilevel Converter (MMC), comprising: a positive rail; a negative rail; a Direct Current (DC) link, including a DC link capacitor, connected between the positive rail and the negative rail; a rectifier, connected between the positive rail and the negative rail, and selectively connected to an auxiliary power source in a wind turbine generator (WTG), wherein the rectifier supplies DC power from auxiliary power source of the WTG on the positive rail and the negative rail having a rectified peak voltage below a pre-charge threshold for the DC link capacitor; a plurality of cells, connected in series between the positive rail and the negative rail, each cell of the plurality of cells comprising: a cell capacitor, connected between a first node and a second node; an insert switch, connected to the first node and a third node; a bypass switch, connected to the third node and the second node; a first flow diode, configured to allow current flow from the third node to the first node and prevent current flow from the first node to the third node; a second flow diode, configured to allow current flow from the second node to the third node and prevent current flow from the third node to the second node; and a gate controller, configured to:

control a voltage across the DC link capacitor and the cell capacitor by switching open and closed the insert switch and the bypass switch of respective ones of the plurality of cells to charge the cell capacitors in the plurality of cells beyond a nominal voltage and then switching open and closed the insert switch and the bypass switch to discharge the cell capacitors to charge the DC link capacitors to the pre-charge threshold, and to drive a bypass switch current includes tuning a rate at which individual bypass switches switch to equalize charges in the cell capacitors as the cell capacitors charge; and to drive an insert switch current includes tuning a rate at which individual insert switches switch to equalize charges in the of cell capacitors as the cell capacitors discharge.

* * * * *